(12) United States Patent
Etgen et al.

(10) Patent No.: US 7,084,872 B2
(45) Date of Patent: Aug. 1, 2006

(54) DIRECT-MANIPULATION USER INTERFACE CONTROL FOR PROPORTIONALLY ADJUSTING A GRAPH OF MULTI-RANGE DATA SETS

(75) Inventors: Michael Peter Etgen, Apex, NC (US); Michael D. Rahn, Rochester, MN (US); Srinivasan Rangaswamy, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 291 days.

(21) Appl. No.: 10/198,558

(22) Filed: Jul. 18, 2002

(65) Prior Publication Data
US 2004/0012589 A1 Jan. 22, 2004

(51) Int. Cl.
*G06T 11/20* (2006.01)
(52) U.S. Cl. ...................................... 345/440
(58) Field of Classification Search ............... 345/440, 345/440.1, 440.2
See application file for complete search history.

(56) References Cited

U.S. PATENT DOCUMENTS

| | | | |
|---|---|---|---|
| 4,847,785 A | | 7/1989 | Stephens ................. 364/518 |
| 5,261,031 A | | 11/1993 | Saito .................... 395/140 |
| 5,432,888 A | | 7/1995 | Iwamura et al. ........... 395/12 |
| 5,485,564 A | * | 1/1996 | Miura ................... 345/440 |
| 5,557,718 A | * | 9/1996 | Tsuneyoshi et al. ....... 345/440 |
| 5,619,631 A | * | 4/1997 | Schott .................. 345/440 |
| 5,777,598 A | * | 7/1998 | Gowda et al. ............ 345/440 |
| 5,844,572 A | * | 12/1998 | Schott .................. 345/440 |
| 5,966,139 A | | 10/1999 | Anupam et al. ........... 345/440 |
| 6,020,898 A | | 2/2000 | Saito et al. ............. 345/440 |
| 6,064,400 A | * | 5/2000 | Wrey .................... 345/440 |
| 6,064,401 A | * | 5/2000 | Holzman et al. .......... 345/440 |
| 6,104,411 A | * | 8/2000 | Ito et al. ............... 345/440 |
| 6,177,938 B1 | | 1/2001 | Gould ................... 345/341 |
| 6,182,085 B1 | * | 1/2001 | Eichstaedt et al. ....... 707/104.1 |
| 6,195,103 B1 | * | 2/2001 | Stewart ................. 345/440 |
| 6,256,628 B1 | * | 7/2001 | Dobson et al. ........... 707/6 |
| 6,492,989 B1 | * | 12/2002 | Wilkinson ............... 345/440 |
| 6,704,012 B1 | * | 3/2004 | Lefave .................. 345/440 |
| 2002/0002560 A1 | * | 1/2002 | Shah et al. ............. 707/200 |
| 2002/0154173 A1 | * | 10/2002 | Etgen et al. ............ 345/833 |

FOREIGN PATENT DOCUMENTS

JP 2000097970 4/2000

* cited by examiner

*Primary Examiner*—Kee M. Tung
*Assistant Examiner*—J. Amini
(74) *Attorney, Agent, or Firm*—A. Bruce Clay, Esq.; Steven M. Greenberg, Esq.; Christopher & Weisberg, P.A.

(57) ABSTRACT

A multi-range data set graph control and adjustment process. A multi-range data set graph adjustment control can include a graph display having at least two axises. At least one of the axises can include a contiguous set of selectable and adjustable segments. A rescaling processor can be configured to rescale segments which are adjacent to an adjusted segment in a proportional manner according to the distance of each of the adjacent segments from the adjusted segment. Also, a graph display plotter can be configured to plot graphs of data in the multi-range data set according the scale of each segment in the contiguous set of selectable and adjustable segments. Notably, the control can be included in an application server analysis tool to provide a visual display of multi-range data sets produced by the analysis tool.

2 Claims, 2 Drawing Sheets

DIRECT-MANIPULATION USER INTERFACE CONTROL FOR PROPORTIONALLY ADJUSTING A GRAPH OF MULTI-RANGE DATA SETS

BACKGROUND OF THE INVENTION

1. Statement of the Technical Field

The present invention relates to the field of visually graphing multi-range data sets and more particularly to the visual adjustment of a graph of multi-range data sets.

2. Description of the Related Art

Multi-range data sets can be defined as the collection of two or more sets of data, each data set having a range of values which differs from the range of values of others of the sets of data. Typically, data sets having disparate value ranges are grouped together in a multi-range data set in attempt to correlate the values of each data set, notwithstanding the disparate range of values of each data set. Thus, an example of a multi-range data can include a set of changing temperatures in a room over time and a count of the number of people in the room over the same time period. While the set of changing temperatures might have a range of seventy degrees Fahrenheit to eighty-degrees Fahrenheit, the count of people might have a range of zero to ten.

In order to correlate different data sets in a multi-range data set, it can be helpful to overlay within a single graph, individual graphs produced for each set of data in the multi-range data set. In this way, the effect of common changes in one component of the multi-range data set can be evaluated across multiple sets of data. For instance, by overlaying individual graphs for the number of patent applications filed per month and the unemployment rate per month over a fixed period of time, a correlation may be ascertained between changes in the number of patent applications filed and changes in the unemployment rate. Still, as the range of values for the unemployment rate can vary from zero to one-hundred, the range of values for patent application filings can range in the thousands. Hence, the scaling down of the range of values for patent application filings, or alternatively the scaling upwards of the range of values for the unemployment rate, will be required.

Scaling multi-range data sets in a single graph can be problematic, however, where the resolution required to qualitatively depict value changes for one set of data in the multi-range data set significantly vary from the resolution required to qualitatively depict value changes for other sets of data in the multi-range data set. For example, in the case of a multi-range data set consisting of one set of data directed to the computational throughput (number of operations per second) of a microprocessor at a given clock frequency, and a second set of data directed to the temperature of the microprocessor at a given clock frequency, changes in temperature responsive to changes in clock frequency will not be readily apparent given the scale of the graph required to accurately illustrate changes in computational throughput relative to changes in clock frequency. Thus, the concurrent display of a multi-range data set can prove less than helpful where the value range of individual sets of data in the multi-range data set vary widely.

In U.S. Pat. No. 5,261,031 to Saito for METHOD AND APPARATUS FOR ENLARGING A TREND GRAPH, it was recognized that in a conventional trend graph representation, where scaling occurs so as to enlarge or expand a portion of the graph, it can be impossible to compare the displayed enlarged portion with other undisplayed enlarged portions of the overall acquired data. In response, Saito proposed the subdivision of the graph display screen into a middle enlarged portion and upper and lower reduced portions. Accordingly, an entire set of data can be represented graphically in the Saito invention, merely by displaying compressed exterior sections of the graph in the upper and lower portions of the display screen while enlarging that section of the graph in the middle enlarged portion of the display screen in which substantial resolution will be required.

Notwithstanding the Saito solution, it will be apparent to one skilled in the art that the Saito invention is limited strictly to a trifurcation of the display screen. Specifically, in Saito, only a single middle section of the graph can be enlarged, while the exterior sections of the graph must be compressed. Secondly, as the display screen is limited to a single enlarged section, multiple sections of the graph cannot be enlarged selectively and simultaneously. Thus, at present a need remains for an effective means for proportionally adjusting a graph of multi-range data sets.

SUMMARY OF THE INVENTION

The present invention is a multi-range data set graph control and adjustment process. A multi-range data set graph adjustment control can include a graph display having at least two axises. At least one of the axises can include a contiguous set of selectable and adjustable segments. A rescaling processor can be configured to rescale segments which are adjacent to an adjusted segment in a proportional manner according to the distance of each of the adjacent segments from the adjusted segment. Also, a graph display plotter can be configured to plot graphs of data in the multi-range data set according the scale of each segment in the contiguous set of selectable and adjustable segments. Notably, the control can be included in an application server analysis tool to provide a visual display of multi-range data sets produced by the analysis tool.

In an alternative embodiment, a multi-range data set graph adjustment control can include a graph display having at least two axises. At least one of the axises can include a contiguous set of selectable and adjustable segments. A rescaling processor can be configured to rescale segments which are adjacent to a manipulated border of an adjusted segment, while not rescaling segments which are not adjacent to the manipulated border. Finally, graph display plotter can be configured to plot graphs of data in the multi-range data set according the scale of each segment in the contiguous set of selectable and adjustable segments. As before, the control can be included in an application server analysis tool to provide a visual display of multi-range data sets produced by the analysis tool.

A method for adjusting the scale of a graph of a multi-range data set can include selecting at least one segment of an axis in the graph for adjustment. The segment can be scaled, the scaling producing an aggregate change in scale for the selected segment. Adjacent unscaled segments can be identified in the axis. Subsequently, each of the adjacent unscaled segments can be rescaled proportionately to a distance of the each of the adjacent unscaled segments to the scaled segment so as to maintain a constant overall dimension of the axis despite the aggregate change in scale.

The scaling step can include selecting an outside border of the selected segment; and, dragging the border along the axis so as to adjust a range of values included in the selected segment. The adjusted range of values can reflect the aggregate change in scale. In consequence, the identifying step can include identifying a set of contiguous unscaled segments which are adjacent to the outside border. Moreover, the rescaling step can include, for each segment in the set except for the segment which is immediately adjacent to the border, computing a rescaling amount according to the equation $\Delta * \frac{1}{2}^{(n-k)}$ where $\Delta$ is the aggregate change, n is the number of segments in the set, and k is a distance of the segment from the border, beginning with 0 and ending in n−1. For the excepted segment, a rescaling amount can be computed which is equivalent to a remaining amount of rescaling required after having rescaled each other segment in the set so as to accommodate the aggregate change. Finally, the rescaling amounts can be applied to each of the segments in the set.

In an alternative embodiment, a method for adjusting the scale of a graph of a multi-range data set can include selecting at least two non-contiguous segments of an axis in the graph for adjustment. Each of the at least two segments can be scaled, the scaling producing an aggregate change in scale for each of the selected segments. For each scaled segment, adjacent unscaled segments in the axis can be identified, and each of the adjacent unscaled segments can be rescaled uniformly so as to maintain a constant overall dimension of the axis despite the aggregate change in scale.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a multi-range data set graph control with which the scale of selected portions of a visual display graph can be selectively adjusted. In particular, in accordance with the present invention, one or more axises of the graph can be partitioned into sections. Each section can be visually denoted at its borders so that the borders can be selectively enlarged or compressed, for instance using a pointing device such as a mouse. When a section has been scaled, either by enlargement or compression, unscaled sections adjacent to the scaled section can be re-scaled so that the overall dimension of the entire axis remains constant. Data points represented within each section can be plotted according to the re-scaled range of each section. In this way, multi-range data sets can be graphed so that pertinent correlations can be identified without incurring the consequence of a complete scaling of all sets of data within the multi-range data set.

Figure 1:
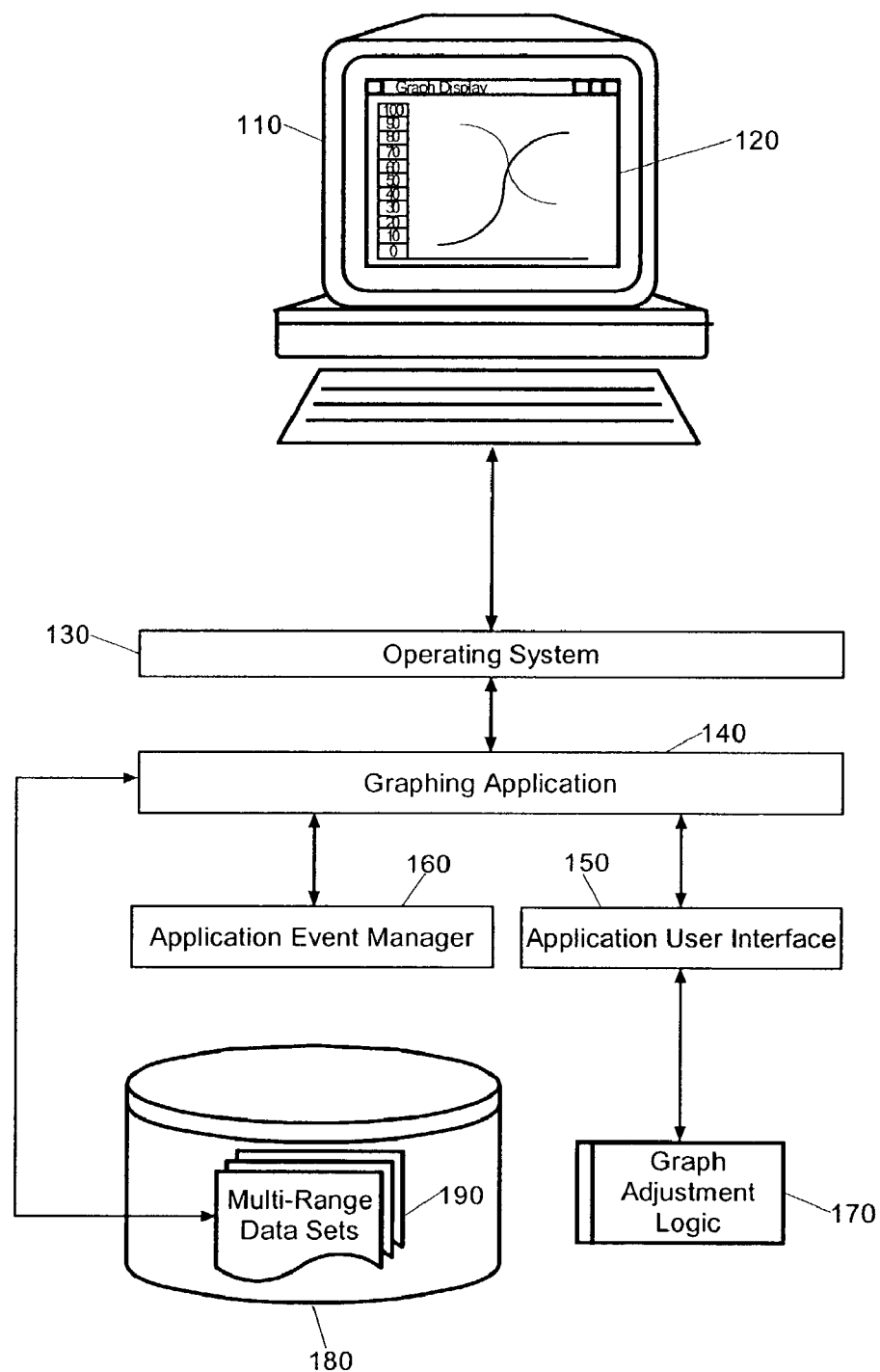
FIG. 1 is a schematic illustration of a graphing application in which a graph adjustment process for multi-range data sets can be performed; and, FIGS. 2A through 2C, taken together, are a pictorial depiction of an exemplary process for adjusting the range of a graph display through which multi-range data sets can be plotted.

FIG. 1 is a schematic illustration of a graphing application in which the multi-range data set graph adjustment control can be disposed. Specifically, a computing device 110 can include a graph display 120 produced by the application user interface 150 of the graphing application 140. The graphing application 140 can execute in association with an operating system 130 which can provide conventional, underlying computing functionality such as core event handling, graphical rendering, and storage input/output. The graphical application 140 also can include an application event manager 160 in which events specific to the graphical application 140 can be processed.

The graphing application 140 can be used to plot the graphs of a multi-range data set 190 stored in fixed storage 180. As an example, the graphing application 140 can be a tool for monitoring the performance of an application server, such as the WebSphere™ Resource Analyzer™ manufactured by International Business Machines Corporation of Armonk, N.Y., United States. In that regard, the graphing application 140 can co-monitor and coordinate data sets including the total number of requests received in the application server, the average response time of the application server, as measured in milliseconds, the total number of errors process in the application server, and the number of loaded servlets executing in the application server. Importantly, as one skilled in the art will recognize, such data sets include disparate ranges and, accordingly, the combination can be characterized as a multi-range data set.

Notwithstanding, the graphing application 140 of the invention is not limited to a complex graph plotting application. Rather, in other embodiments, the graphing application 140 can be a user interface control, similar to a table control, a spinner box and the like. In this regard, the graphing application 140 can include a visual display, functionality for plotting supplied data in the visual display, and functionality for scaling the axises of the visually displayed portions of the control according to the adjustment process of the present invention. As a control, the graphing application 140 simply can include an application programming interface (API) through which more complex programs can access the functionality of the graphing application 140.

Significantly, the graphing application 140 can include graph adjustment logic 170. The graph adjustment logic 170, responsive to user interface events specifying a scaling change for a selected portion of a graph displayed through the application user interface 150, can scale the selected portion of the graph while re-scaling adjacent unscaled portions of the graph so as to maintain a constant overall dimension of the axis in which the scaling had been specified. Thus, the graphing application 140 can provide functionality for the direct manipulation of one or more portions of the graph of a multi-range data set so that a section of the data set which is of interest can be shown with selectively increasing levels of detail. In consequence, end users can more easily identify important variations in the data set due to the expanded detail shown in the enlarged portion of the graph.

Figure 2A:
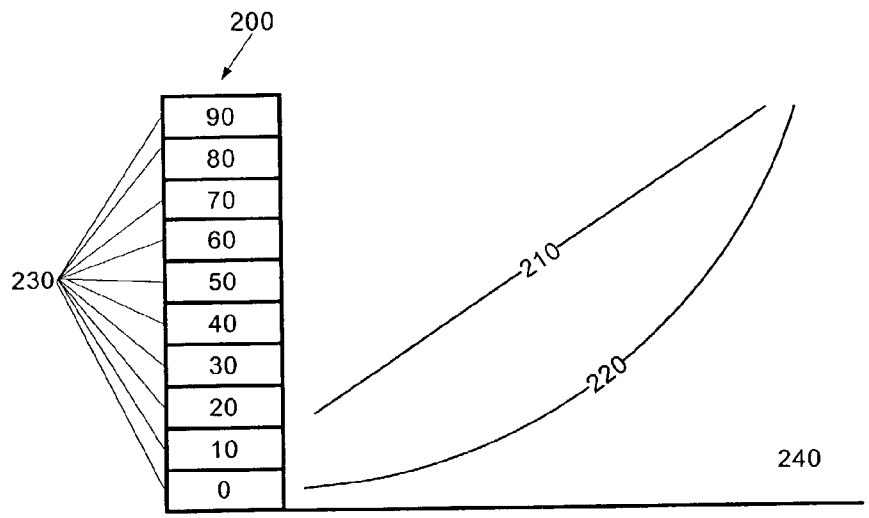
Figure 2B:
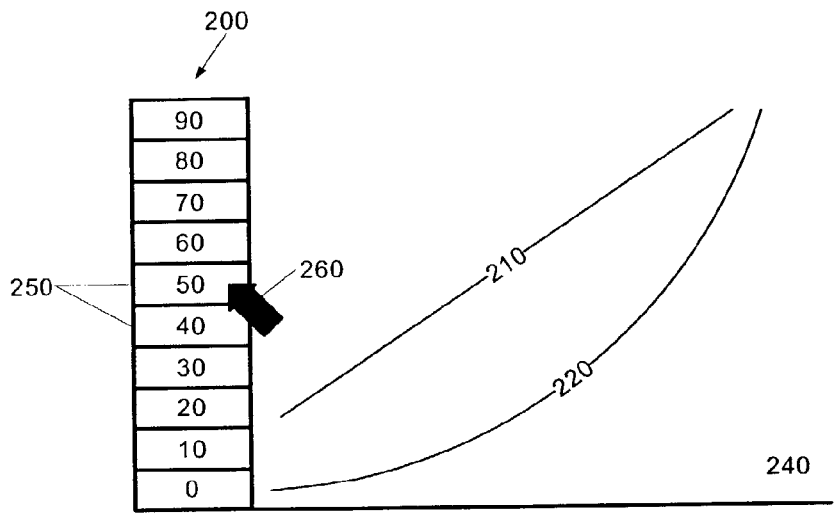
Figure 2C:
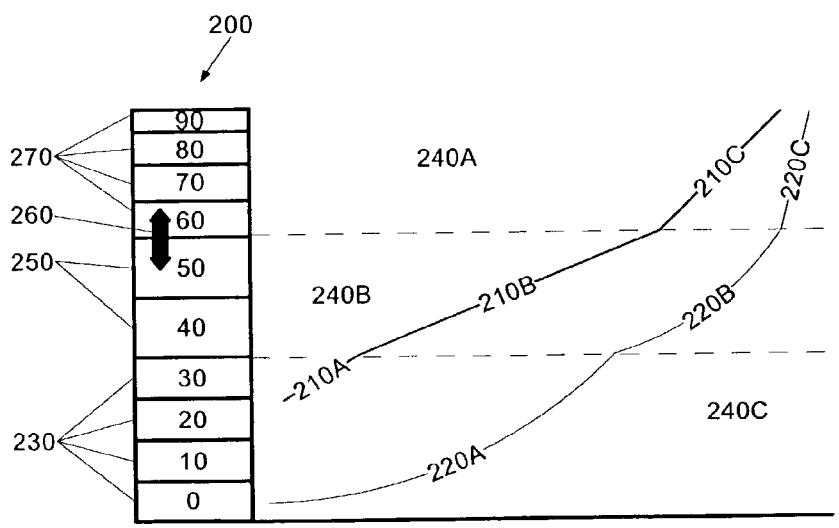

FIGS. 2A through 2C, taken together, are a pictorial illustration of a process for adjusting the range of a graph display through which multi-range data sets can be graphed. Referring specifically to FIG. 2A, an exemplary pair of plots 210, 220 of sets of data from a multi-range data set can be displayed in the graph display area 240. One or more of the axises of the graph display area 240 can be segmented into a discrete number of partitions 230. For example, as shown in FIG. 2A, the vertical axis 200 of the graph display area 240 can be partitioned into ten equal segments of ten vertical units each. Thus, as will be apparent from the illustrated example, the scale of each one of the partitions 230 can remain uniform so that the sum total dimension of the partitions 230 consumes the majority of the graph display area 240. In the example shown in FIG. 2A, then, the sum total dimension of the partitions 230 of the vertical axis 200 can be one-hundred units.

Referring now to FIG. 2B, the graph display application providing the underlying infrastructure for the graph display area 240 can receive and process user interface events either directly, or through the operating system event manager. Those user interface events for which the graph display application can be pre-configured to handle can include pointing device and keyboard events such as a mouse-over event or a mouse-down event. In consequence, the graph display application can be configured to perform a graph adjustment process responsive to user interface events such as when an end-user, using a pointing device 260 such as a mouse pointer, selects one or segments 250 in an axis such as the vertical axis 200 for scaling.

More particularly, as shown in FIG. 2C, once one or more segments 250 have been selected for scaling, the segments can be scaled-either expanded as shown, or collapsed (not shown). Specifically, the end-user can grab an outer border of the selected range of segments positioned beneath the mouse pointer 260, and can drag the border in either direction in order to effectuate an expansion or contraction. By expanding the segments 250, additional resolution can be acquired in the zone of expansion 240B as will be apparent from the changing displayed characteristic of the plots 210B, 220B which fall within the zone of expansion 240B.

Importantly, unlike prior art graph scaling techniques, in the graph adjustment process of the present invention, the enlargement of a central portion of graph need not require a corresponding, proportional compression of the outer portions of the graph. Rather, in accordance with the present invention, only the unscaled segments 270 which are adjacent to the manipulated border need be re-scaled. Specifically, the unscaled segments 270 can be compressed programmatically to form a re-scaled zone, in this case a zone of compression 240A. As a result, the plots 210C, 220C can acquire a lower resolution resulting from the compression. Significantly, the unscaled segments 230 which are not adjacent to the manipulated border can remain unscaled. As a result, the initial visual characteristic of the plots 210A, 220A in the unchanged zone 240C can remain as had been the case in FIGS. 2A and 2B.

In accordance with the present invention, the graph adjustment process can be repeated for multiple segments of an axis. Furthermore, the graph adjustment process can be performed across multiple axis. Specifically, each a group of segments in an axis are selected for scaling and in fact scaled, the unscaled segments which are adjacent to the manipulated border can be rescaled so as to maintain a constant overall dimension of the associated axis. Where there remain no unscaled segments adjacent to the manipulated border, the attempt to scale the selected segments can be denied. Alternatively, all of the segments adjacent to the manipulated border can be rescaled, regardless of whether the segments had been scaled recently. Of course, one skilled in the art will recognize a multiplicity of techniques for selecting segments to be rescaled and the invention is not strictly limited to any one technique.

In one aspect of the present invention, the scaling process itself can account for several factors. First, the number and identity of the selected segments can be determined. Second, the extent of the scaling can be determined. In particular, the number of units of expansion or contraction for the entire selected block of segments can be determined. Third, the number and identity of the unscaled segments which are adjacent to the manipulated border of the selected segments can be determined, as can the total range of each segment. Finally, a new range for each segment can be computed so as to maintain a constant overall dimension of the axis. Subsequently, the data points falling each range of scaled and rescaled segments can be replotted.

Notably, each of the rescaled segments need not be rescaled uniformly. That is, in order to maintain the overall dimension of the axis in which the segments reside, it is not required that each of the rescaled segments experience an equal reduction or expansion of range. Rather, in accordance with a preferred aspect of the present invention, the individual segments can be rescaled proportionally to their distance from the manipulated border. For example, where only those unscaled segments which are adjacent to the manipulated border are to be rescaled, one acceptable rescaling technique can include a rescaling based upon the equation, $$\Delta * \frac{1}{2}^{(n-k)}$$

where $\Delta$ is the scaled number of units by which the entire selected group of segments has increased or decreased, n is the number of segments to be rescaled and k is the segment distance from the border, beginning with 0 and ending and n−1. As will be recognized by one skilled in the art, the segment which is closest to the manipulated border can be rescaled by the number of units remaining to be rescaled after all other affected segments have been rescaled.

Thus, as shown in FIG. 2C, where the affect segments 250 have been scaled from an initial size of twenty-five units each to a size of seventy units in total, twenty extra units have been added to the overall dimension of the axis 200. To maintain a constant axis dimension of one-hundred units, then, each of the unscaled segments 270 which are adjacent to the manipulated border are to be rescaled. Specifically, the four segments 270 each can be identified as segments 0, 1, 2 and 3. In consequence, segment 90, furthest away from the manipulated border can be compressed from twenty-five units to fifteen units. Similarly, segment 80 can be compressed from twenty-five units to twenty units. Segment 70 can be compressed from twenty-five units to twenty-two and one half units. Finally, the remaining balance of two and one-half units can be deducted from the range of segment 60.

As will be recognized by one skilled in the art, the foregoing scaling technique is not strictly limited to scaling merely unscaled segments which are adjacent to the manipulated border of a scaled segment or group of segments. Rather, in the case where all unscaled segments which are adjacent to a scaled segment or group of segments are to be rescaled, the rescaling factor for each segment can be halved. Moreover, the scaling technique can be inverted to accommodate for the opposite positioning of each set of adjacent segments.

The present invention can be realized in hardware, software, or a combination of hardware and software. An implementation of the graph adjustment control of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for adjusting the scale of a graph of a multi-range data set, the method comprising the steps of:
    selecting at least one segment of an axis in the graph for adjustment;
    scaling said at least one segment, said scaling producing an aggregate change in scale for said selected at least one segment;
    identifying adjacent unscaled segments in said axis;
    rescaling each of said adjacent unscaled segments proportionately to a distance of said each of said adjacent unscaled segments to said scaled at least one segment so as to maintain a constant overall dimension of said axis despite said aggregate change in scale;
    wherein said scaling step comprises the steps of:
    selecting an outside border of said selected at least one segment; and,
    dragging said border along said axis so as to adjust a range of values included in said selected at least one segment, said adjusted range of values reflecting said aggregate change in scale;
    wherein said identifying step comprises the step of identifying a set of contiguous unscaled segments which are adjacent to said outside border; and,
    wherein said rescaling step comprises the steps of:
    for each segment in said set except for the segment which is immediately adjacent to said border, computing a rescaling amount according to the equation:

$\Delta * \frac{1}{2}(n-k)$ where $\Delta$ is said aggregate change, n is the number of segments in said set, and k is a distance of said segment from said border, beginning with 0 and ending in n−1;
    for said excepted segment, computing a rescaling amount equivalent to a remaining amount of rescaling required after having rescaled each other segment in said set so as to accommodate said aggregate change; and,
    applying said rescaling amounts to each of said segments in said set.

2. A machine readable storage having stored thereon a computer program for adjusting the scale of a graph of a multi-range data set, said computer program comprising a routine set of instructions for causing the machine to perform the steps of:
    selecting at least one segment of an axis in the graph for adjustment;
    scaling said at least one segment, said scaling producing an aggregate change in scale for said selected at least one segment;
    identifying adjacent unscaled segments in said axis;
    rescaling each of said adjacent unscaled segments proportionately to a distance of said each of said adjacent unscaled segments to said scaled at least one segment so as to maintain a constant overall dimension of said axis despite said aggregate change in scale;
    wherein said scaling step comprises the steps of:
    selecting an outside border of said selected at least one segment; and,
    dragging said border along said axis so as to adjust a range of values included in said
    selected at least one segment, said adjusted range of values reflecting said aggregate change in scale;
    wherein said identifying step comprises the step of identifying a set of contiguous unscaled segments which are adjacent to said outside border; and,
    wherein said rescaling step comprises the steps of:
    for each segment in said set except for the segment which is immediately adjacent to said border, computing a rescaling amount according to the equation:

$\Delta * \frac{1}{2}(n-k)$ where $\Delta$ is said aggregate change, n is the number of segments in said set, and k is a distance of said segment from said border, beginning with 0 and ending in n−1;
    for said excepted segment, computing a rescaling amount equivalent to a remaining amount of rescaling required after having rescaled each other segment in said set so as to accommodate said aggregate change; and,
    applying said rescaling amounts to each of said segments in said set.

* * * * *